United States Patent [19]
Haswell et al.

[11] 3,878,086
[45] Apr. 15, 1975

[54] ELECTRODIALYSIS STACK AND SPACER FOR USE THEREIN

[75] Inventors: David B. Haswell, Fitchburg; John L. Eisenmann, Hingham, both of Mass.

[73] Assignee: Process Research, Incorporated, Cambridge, Mass.

[22] Filed: May 1, 1972

[21] Appl. No.: 249,690

[52] U.S. Cl. ............................................. 204/301
[51] Int. Cl. ......................................... B01d 13/02
[58] Field of Search ...................... 204/301, 180 P

[56] References Cited
UNITED STATES PATENTS

| | | | |
|---|---|---|---|
| 2,891,899 | 6/1959 | Mason et al. | 204/301 |
| 2,948,668 | 8/1960 | Whalley et al. | 204/301 |
| 3,223,612 | 12/1965 | Chen et al. | 204/301 |
| 3,488,276 | 1/1970 | Tarsey | 204/301 |

OTHER PUBLICATIONS
Wilson, "Demineralization by Electrodialysis," 1960, TD 433 P7 C.2, pp. 310 & 311.

Primary Examiner—John H. Mack
Assistant Examiner—A. C. Prescott
Attorney, Agent, or Firm—Cesari & McKenna

[57] ABSTRACT

An improved electrodialysis stack and method of constructing the same wherein a multi-ply membrane spacer is used, the spacer consisting of a relatively thick and relatively flexbiel interior ply and two relatively thin exterior plies formed of a more rigid material than is the interior ply. These exterior plies are held together by a water-resistant pressure-sensitive adhesive. The resultant spacer may be adhesively bonded to cationic and anionic membranes on each side thereof, and thereby form a part of an essentially solid laminar dialysis stack which is free from cross-leaking and seepage problems.

19 Claims, 8 Drawing Figures

PATENTED APR 15 1975　　3,878,086
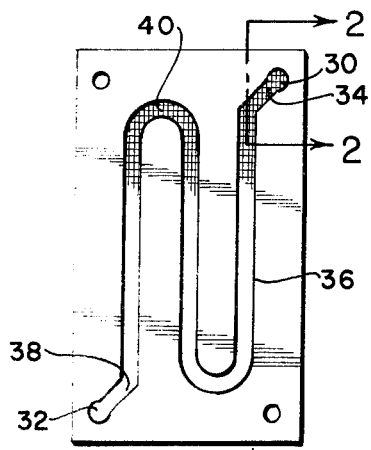
Fig.1
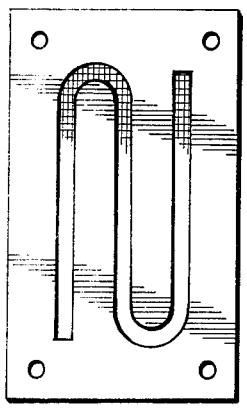
Fig.1A
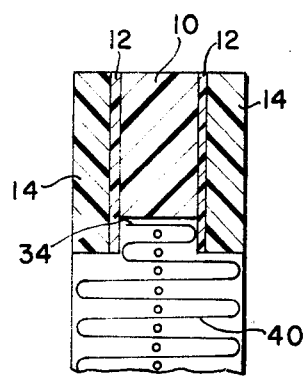
Fig.2
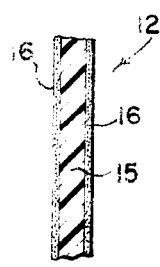
Fig.3
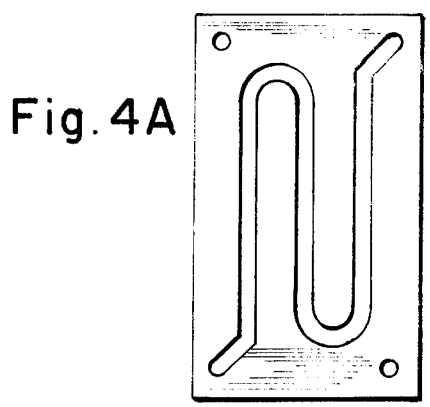
Fig.4A
Fig.4B
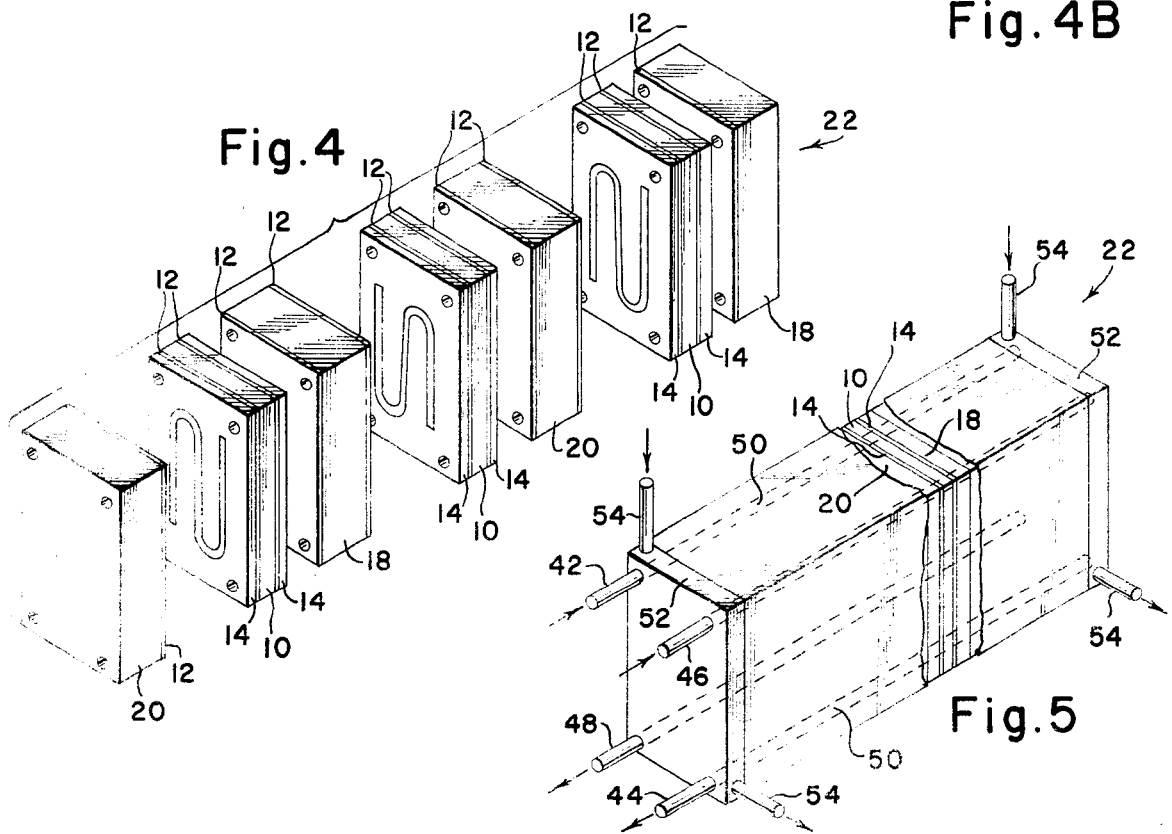
Fig.4
Fig.5

ELECTRODIALYSIS STACK AND SPACER FOR USE THEREIN

BACKGROUND OF THE INVENTION

The invention relates to new spacers and new electrodialysis stack incorporating the same.

Electrodialysis is a well known electrochemical process whereby a solution to be treated is passed between an anode and a cathode. Appropriate ion-permeable membranes are placed between the solution to be treated and the respective electrodes so that the anions tend to be drawn toward the anode and the cations toward the cathode. Thus a feed stream being treated is diluted with respect to these ions. On each side of the compartments through which the feed stream is caused to flow, that is on the other side of each ionic membrane from the feed stream is a "concentrate" compartment wherein the ions are concentrated.

In usual practice a number of concentrate compartments are formed into an electrodialysis stack with a number of alternating diluent, i.e., feed, compartments. The feed and concentrate compartments are manifolded independently so that each compartment forms a parallel flow path for the feed being diluted and the output being concentrated.

In some electrodialysis operations, the membranes selected for use are thin and very flexible. Among the uses in which such membranes find utility are those wherein a relatively large pressure differential exists across the membrane, i.e., between the feed and concentrate compartments. In these situations where thin membranes are used there is a tendency for the membrane to bow towards the compartments having the lower pressure. This usually means that either (1) the processor must tolerate some leakage between (a) feed and concentrate compartments and (b) seepage of liquid to the outside of the electrodialysis stack or (2) the processor must use relatively expensive mechanical sealing means to avoid leaks.

As one approach to providing lightweight dialysis apparatus, it has been suggested, e.g., in U.S. Pat. No. 3,488,276 to Tarsey, to adhesively connect flow-directing membrane spacers to the periphery of adjacent membranes. Tarsey, in his construction, uses heavy end gasketing means to restrain one surface of his membrane but relatively little support to prevent bowing on either side of his membrane.

SUMMARY OF THE INVENTION

It is an object of the present invention to provide an economic, dimensionally stable, and substantially leak-proof electrodialysis stack.

Another object of the invention is to provide a multi-ply novel membrane spacer suitable for use in the aforesaid module.

Another object of the invention is to provide a novel process for making electrodialysis apparatus in such a way as to minimize cross-leaking, e.g., leaking of diluent from the feed stream into the concentrate stream, especially when there is a substantial pressure differential between the streams.

A further object of the invention is to provide a spacer for use in electrodialysis which spacer is versatile in that a number of flow configurations can be interchangeably used therewith.

Other objects of the invention will be obvious to those skilled in the art on reading the instant application.

The above objects have been substantially achieved by construction and utilization of a novel multi-ply membrane spacer. This spacer comprises an inner ply having therein ports partially forming inlet and outlet manifold conduits, a primary flow path to allow the liquid to contact the membrane surface, and channels connecting the inlet and outlet ports to the primary flow path. On each side of the inner ply and bonded thereto, are outer plies which comprise matching inlet and outlet ports also forming part of the manifold conduits and which comprise also a flow path generally congruent with that of the inner ply. A flow distributor means, e.g., a plastic grid, is fitted into the primary flow path and, advantageously extends into the channels connecting the inlet and outlet ports to the primary flow path. This extension into the channel is found to be particularly convenient during assembly of the spacer using a pressure sensitive adhesive because it helps keep the outer plies from contacting one another and closing, or undesirably restricting, the cross sectional areas of the channels.

The multi-ply spacer advantageously comprises an inner ply of a relatively low modulus material, say polyethylene or the like, sandwiched between two exterior reinforcing plies of a relatively high modulus material, say a polyester terephthalate such as that sold under the trade designation Mylar by DuPont or the like. The reinforcing plies can be relatively thin when compared to the inner ply, yet each reinforcing ply can contribute more mechanical strength to the structure than does the inner ply formed of the lower modulus material.

Each ply of the spacer comprises a cut out portion which forms a flow path for diluent or concentrate fluid. In this flow path is a flow-directing and turbulence-promoting means, usually a flexible plastic grid which is advantageously removable so that it can be changed from time to time as the separator is used under various processing conditions or in processes requiring different flow and turbulence characteristics across the face of the membrane.

The various plies of the spacers are adhered together by use of a double-coated, pressure-sensitive, adhesive sheet with one such adhesive sheet being placed between adjacent plies. Usually, the adhesive sheets first will be applied to the reinforcing plies, and then these plies and the adhesive sheet are die cut before being sealed to the polyethylene and thereby incorporated into the spacer structure.

A module comprising a cationic membrane, anionic membrane, and spacer as described above can be formed by using another double-coated adhesive tape between the spacer itself and a membrane on either side thereof. A particular advantage of the invention is that the membrane can be adhesively incorporated into the module while still wet. The seal between membrane and adhesive is strong; indeed, it is usually strong enough so that it exceeds the internal cohesive strength of the membrane itself. Thus, in a subsequent attempt to tear the membrane from the spacer, the tearing will occur within the membrane material itself rather than at the adhesive bond. In an alternate technique, the adhesive-bearing sheet need not be incorporated into the finished spacers or modules. In this alternate technique, the adhesive is transferred to the separator plies from a carrier sheet which has been treated with a release agent. The resulting adhesive joints do not comprise the sheet member and, as a consequence, are somewhat thinner; this may be an important factor in design of a particular apparatus.

It has been found to be important that the adhesive used in bonding membranes not require drying as is common in solvent-based adhesive systems. This is because the time required for solvent drying will tend to result in a simultaneous and sometimes excessive drying of the membrane itself. Most membranes must remain wet to avoid excessive drying and resultant distortion. This is especially true of the relatively flimsy membranes most susceptible to leaking problems to which this invention is directed.

In some circumstances, it will be more desirable to do without the adhesive bond between spacer and membrane. For example, in many cases the membranes themselves may form effective sealing means with the outer surface of the spacer. Thus when the stack is to be used for test work, to be broken down for inspection, or to be broken down to change the flow characteristics by changing to different turbulence promotors, the membranes will not be adhesively bonded to the adjacent spacer.

Unique electrolysis stacks can be formed of modules consisting of membranes sealed to spacers by the process of the invention. In such stacks, leakage to the outside of the stack or intrastream "short-circuiting" is virtually eliminated. Slippage between spacers and membranes is eliminated. The stack is an integral laminated block comprising therein hydraulically isolated passages to accommodate the flow of feed, concentrate, and electrode-flush liquids which, as is known in the art are often recirculated past the electrode proper. Such a stack is easily handled and may be operated with relatively large pressure differentials between various paths.

The invention finds particular utility in constructing electrodialysis stacks with relatively thin flexible membranes which have insufficient strength to resist being distorted by moderate operating pressures. Among such membranes are those of relatively low flexural rigidity. By "flexural rigidity" is meant that value established by A S T M Test D 1833-64. The value is measured by use of the relationship:

$$G = WC^3$$

wherein G is the flexural rigidity in milligram-centimeters; W is the weight per unit area of the membrane (one surface) in milligrams per square centimeter; and C is the bending length, i.e., one-half the length of an overhang subtending 41.5°.

A membrane is maintained in the wet state during the test. The following are some typical test results.

| Commercial Designation of Membrane | Thickness cm | W mg/cm² | Flexural Rigidity |
|---|---|---|---|
| AMF, C-103 | 0.013 | 13.9 | 662 |
| Tokuyama CL-2.5T | 0.015 | 20.8 | 2420 |
| Tokuyama, AV-4T | 0.018 | 18.8 | 2710 |
| Ionac, MC-3470XL | 0.051 | 52.4 | 10260 |
| Ionac, MA-3475X1 | 0.056 | 50.5 | 8380 |

The latter two membranes are asymmetric and were measured with one side up only, rather than two sides up.

It has been found that the invention is an improved way of assembling membranes having a flexural rigidity of about 10,000 or less, but is particularly advantageous with membranes having a flexural rigidity of less than about 4,000

The membrane should, most desirably be bonded to at least 20% of the surface of the reinforcing member when highly flexible membranes are used.

ILLUSTRATIVE EMBODIMENT OF THE INVENTION

In this application and accompanying drawings there is shown and described a preferred embodiment of the invention and suggest various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

IN THE DRAWINGS

FIG. 1 is a side elevation of the inner ply of a spacer formed according to the invention.

FIG. 1A is a side elevation of the exterior ply of a spacer.

FIG. 2 is an enlarged, schematic, and fragmentary end view in elevation of the spacer shown in FIG. 1.

FIG. 3 is an end view in elevation of a double coated adhesive sheet used in some embodiments of the invention.

FIG. 4 is an end view, schematic and in elevation, of a part of a laminated block electrodialysis stack utilizing spacers and membranes according to the teachings of the invention.

FIGS. 4A and 4B show the alternate arrangement of spacers in the stack of FIG. 4.

FIG. 5 illustrates, schematically, a laminated stack 22 made according to the invention.

Referring to FIGS. 1 through 3, it is seen that a membrane spacer 9 is formed of a number of plies, each ply being of the general shape shown in FIG. 1 excepting that the outer plies of the spacers do not have a manifold inlet channels described below. Each ply is cut out to have an inlet port 30 and an outlet port 32. Inlet 30 is connected by a manifold inlet channel 34 to a serpentine flow path 36 which terminates in a manifold inlet channel 38 and outlet port 32. As indicated on FIG. 1, flow path 36 comprises a turbulence-promoting and fluid velocity-conditioning means in the form of a woven polymeric grid 40 or the like. Grid 40 is removable and replaceable or can be fixed, e.g., molded, into the polyethylene sheet.

FIG. 2 discloses an end view of a multi-ply spacer 9 formed of a pair of poly(ethylene terephthalate) reinforcing sheets 14 formed of a material sold under the trade designation Mylar by E.I. DuPont de Nemours and Co., Inc., and a sheet 10 of low density polyethylene. Sheet 10 is 0.02 inch thick; sheets 14 are about 0.010 inch thick. Between sheet 10 and sheets 14 are adhesive sheets 12 carrying, on each side of a base sheet 15, pressure-sensitive adhesive coatings 16. (See FIG. 3 for more detail thereon.) Sheets 12 are more conveniently applied to a blank reinforcing sheet, then die cut to form the desired flow pattern, and only then applied to polyethylene sheet 10.

Adhesive 16 is advantageously a water-insoluble organic polymer based pressure adhesive. This adhesive is substantially free of volatile solvents. One suitable commercial adhesive material is that sold under the trade designations MAC bond 9626 by Morgan Adhesives Company.

FIG. 4 illustrates schematically a part of an electrodialysis stack wherein spacers 9 have been adhesively bonded to the face of relatively flimsy ion exchange membranes, a cationic membrane 18 and an anionic membrane 20. Membranes 18 and 20 are themselves bonded to additional multi-ply laminated spacers 9 by means of more double-coated adhesive sheets 12 and so forth to form an entire electrodialysis stack 22 as illustrated in FIG. 5 and which is an integrated laminate and a solid block in form except for the necessary fluid flow paths. These flow paths will take up about 50% of the volume of the stack, exclusive of end plates or electrode compartments.

Normally there will be four manifold-type flow paths one each for feed inlet 42, feed outlet 44, product inlet 46, and product outlet 48. In some situations, however, one or more of the feed paths may be dispensed with. For example, in some applications, there is no need for a product inlet as all of the material to be discharged from the concentrate cells will have passed thereinto through the membranes. The electrodialysis stack will often have terminal electrode-housing compartments 52 which will be provided with means 54 to circulate wash solutions therethrough as is known in the art.

Thus each manifold flow path 50 will normally be formed by a series of short cylindrical portions of membranes and spacers, and each alternate spacer will be in a compartment or cell wherein it is wished to introduce, or remove, fluid. In such cases the closed wall of the manifold conduit will be interrupted by a channel, such as shown in FIG. 1 as 32 and 34, communicating with the primary flow path.

When a stack is formed according to the invention, that block-like portion of it bounded by the electrode compartments will most preferably comprise 25% or more, preferably more than 50%, void volume — i.e., volume available to accomodate liquid being processed.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

What is claimed is:

1. A flow-directing spacer for use between the cationic and anionic membranes of electrodialysis apparatus comprising a relatively thick inner ply of a relatively low modulus polymer sandwiched between two outer and relatively thin plies of relatively high modulus polymer, wherein the bonds between the outer and inner plies are formed of a pressure sensitive adhesive, and wherein a turbulence promoting means is placed within a flow path defined by an aperture in said spacer, the aperture being the depth of the three said plies 2. A spacer as defined in claim 1 wherein the total thickness of the inner ply is equal or greater than the total thickness of the two outer plies.

3. A spacer as defined in claim 1 wherein said outer plies formed of polyester terephthalate and said inner ply if formed of a polyolefin.

4. An electrodialysis apparatus formed of a laminated block article wherein the ion exchange membranes and spacers as defined in claim 1 are adhered together with an adhesive and comprising within said block separate conduits for the flow of concentrated and diluent through said block.

5. A stack as defined in claim 4 wherein a major portion of the volume of the said block is hollow.

6. A process for making an electrodialysis apparatus comprising the step whereby the anionic and cationic membrane are bonded to a spacer on each side thereof and over at least 20% of the surface of the membrane by means of a substantially volatile-free pressure sensitive adhesive thereby forming an integral block shaped laminate.

7. A process as defined in claim 6 wherein said adhesive bond is formed with a double-coated adhesive base sheet.

8. A process as defined in claim 7 wherein said adhesive bond is formed by transferring said adhesive from a release sheet onto each side of a spacer and then pressing a membrane against each side of said spacer.

9. A multi-ply membrane flow-directing spacer of claim 1 for use between the ionic membranes of an electrodialysis stack including (1) an inner ply defining a primary flow path, manifold-defining inlet and outlet ports, and channels connecting said flow path to said inlet and outlet ports and (2) two exterior plies defining the same primary flow path configuration and manifold defining inlet and outlet ports but being free of any channel connecting said flow path and said inlet and outlet ports.

10. A spacer as defined in claim 9 comprising a flow-distributing means substantially throughout the aforesaid flow path.

11. A spacer as defined in claim 10 wherein said flow distributing means extends into said channels.

12. A spacer as defined in claim 9 wherein said inner ply is equal or greater in thickness than the total thickness of the two outer plies.

13. A spacer as defined in claim 10 wherein the plies are bonded to one another by a pressure-sensitive adhesive means.

14. Electrodialysis apparatus as defined in claim 4 where said spacers include (1) an inner ply defining a primary flow path, manifold-defining inlet and outlet ports and channels connecting said flow path to said inlet and outlet ports and (2) two exterior plies defining the same primary flow path configuration and manifold-defining inlet and outlet ports but being free of any channel connecting said flow path and said inlet and outlet ports.

15. Electrodialysis apparatus as defined in claim 14 wherein at least 20% of the surface area of all said membranes are bonded to the opposing surfaces of said spacers.

16. Electrodialysis apparatus as defined in claim 14 wherein said membranes have a flexural rigidity of less than 10,000 mg-cm.

17. Apparatus as defined in claim 16 wherein said membranes have a flexural rigidity of less than 4,000 mg-cm.

18. Electrodialysis apparatus as defined in claim 15 comprising a flow-distributing means substantially throughout the aforesaid flow path.

19. Electrodialysis apparatus as defined in claim 17 comprising a flow-distributing means substantially throughout the aforesaid flow path.

* * * * *